United States Patent [19]

Nishibayashi

[11] Patent Number: 5,020,555

[45] Date of Patent: Jun. 4, 1991

[54] CONTINUOUS WASHING APPARATUS

[76] Inventor: Seitaro Nishibayashi, 2-36-910, Minamiothsuka, Toshima-ku, Tokyo, Japan

[21] Appl. No.: 376,311

[22] Filed: Jul. 6, 1989

[30] Foreign Application Priority Data

Sep. 30, 1988 [JP] Japan ................................ 63-246541

[51] Int. Cl.⁵ .............................................. B08B 3/06
[52] U.S. Cl. ........................................ 134/65; 134/132
[58] Field of Search ............................ 134/60, 65, 132; 99/536

[56] References Cited

U.S. PATENT DOCUMENTS

| | | | |
|---|---|---|---|
| 549,097 | 11/1895 | Baker | 134/132 X |
| 1,530,415 | 3/1925 | Roussel | 134/66 V |
| 2,314,871 | 3/1943 | Back | 134/65 |
| 2,555,908 | 6/1951 | Edeskuty et al. | 134/132 X |
| 2,925,821 | 2/1960 | MacDonald | 134/65 |
| 3,498,839 | 3/1970 | Menta | 134/65 X |
| 3,658,072 | 4/1972 | Santucci | 134/65 |
| 4,073,301 | 2/1978 | Mackinnon | 134/65 |
| 4,098,225 | 7/1978 | Norman | 134/65 X |
| 4,611,612 | 9/1986 | Obie et al. | 134/65 |

FOREIGN PATENT DOCUMENTS

| | | | |
|---|---|---|---|
| 2161446 | 3/1973 | Fed. Rep. of Germany | 134/65 |
| 2806126 | 8/1979 | Fed. Rep. of Germany | 134/132 |
| 59-40437 | 9/1984 | Japan | 99/536 |
| 1298151 | 3/1987 | U.S.S.R. | 198/676 |

Primary Examiner—Frankie L. Stinson
Attorney, Agent, or Firm—Tarolli, Sundheim & Covell

[57] ABSTRACT

In a continuous washing apparatus including an elongated inclined cylindrical washing tub having an inlet and an outlet of washing objects, a screw assembly rotatably mounted in the washing tub to transfer the washing objects from the inlet region to the outlet region, and a cleaning means to clean the washing objects, the screw assembly is a bank-like helical fin extending longitudinary in the washing tub and a large central opening formed by the fin so that a generally constant quantity of objects is conveyed by the fin.

4 Claims, 3 Drawing Sheets

CONTINUOUS WASHING APPARATUS

FIELD OF THE INVENTION

The present invention relates to a continuous washing apparatus which is suitably used to continuously wash a large quantity of objects e.g. dishes, fruits or potatoes.

DESCRIPTION OF PRIOR ART conventional continuous dish washers generally include a moving conveyor on which disher are aligned, and upper and lower nozzle inject water continuously to the dishes. However, as the dishes stand still relative to the conveyor, the washing effect is not satisfactory. operability is poor due to the splashing of water spray, and frequent stoppages which result in high maintenance costs.

Many proposals have been made to improve these faults, one example is shown in Japanese Patent Publication No. 51-112565 which shows that washing objects fed in a water tank from a hopper are conveyed by a motor driven screw and are washed in a frame with bars. Dirty water flows between the bars to the tank and the washing objects are conveyed along the inclination of the frame with bars and dried and conveyed continuosly by a chute.

However, such prior continuous washing apparatus includes disadvantages such as that when a large quantity of washing objects are fed simultaneously from the hopper the screw must convey the objects in locally overloaded conditions so that washing effect decreases and the objects being washed are thus apt to be destroyed; and further, the motor and the screw are overloaded decreasing the service life of the washing apparatus.

Accordingly, the primary object of the present invention is to provide an improved continuous washing apparatus which will solve the above mentioned disadvantages to improve the washing effect without damaging the objects being washed.

SUMMARY OF THE INVENTION

The continuous washing apparatus, according to the present invention, includes an inclined washing tub having an inlet and an outlet for washing objects and a motor driven helical fin which is supported at both ends of the washing tub, and a large central opening is formed by the helical fin.

In operation, as the fin rotates, the objects being washed are moved from the inlet to the outlet by the fin and the moving height of the objects is limited by the width of the fin. While moving, excess objects over the width of the fin pass rearward through the central opening formed by the fin so that the feed quantity of the fin is gradually balanced and is limited by the width of the fin. As the washing proceeds, the washing objects are washed by a stream of washing agent and debris separated from the objects passes through many small openings in the fin and between the clearance between the fin and the tub to the inlet direction of the tub.

DESCRIPTION OF THE DRAWINGS

The features and advantages of the present invention will become apparent in view of the following detailed description of preferred embodiments of the invention taken in conjunction with the accompanying drawings, wherein.

DESCRIPTION OF THE PREFERRED EMBODIMENTS

Figure 1:
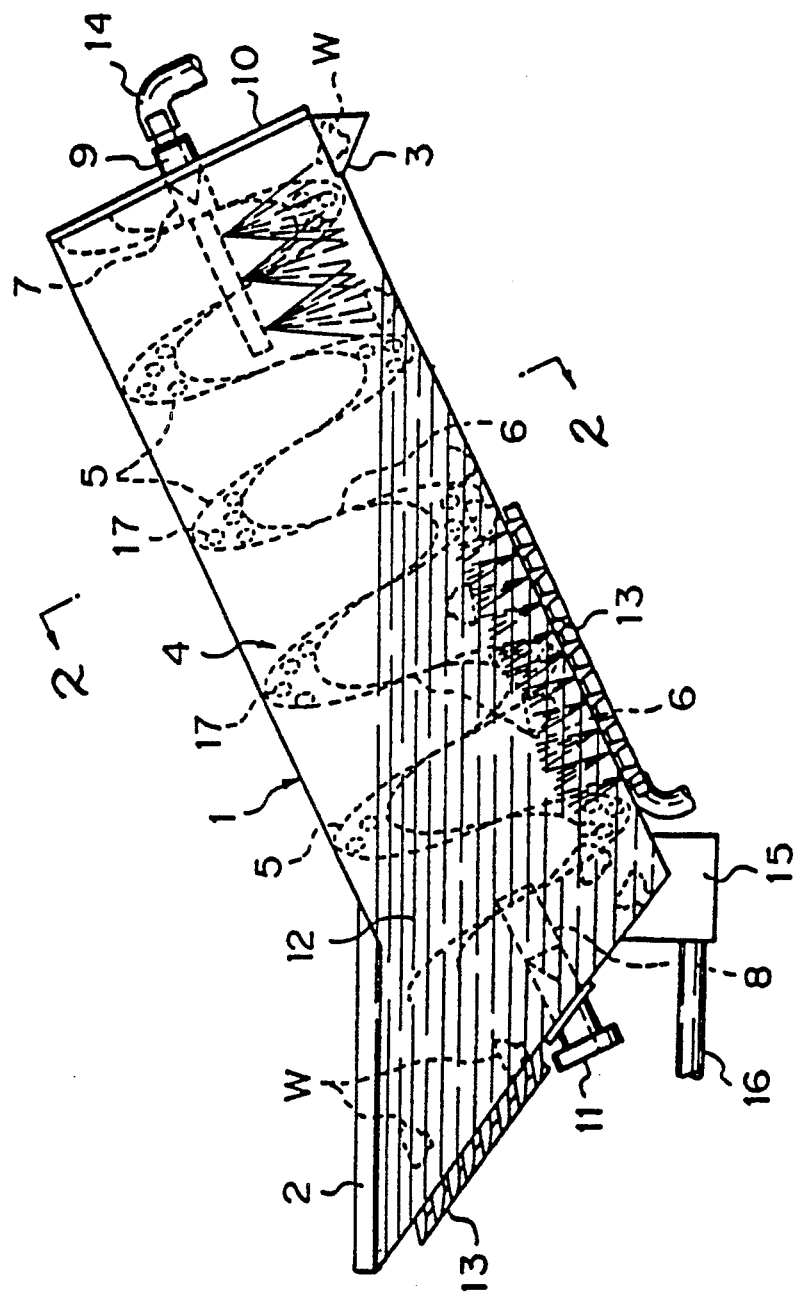
FIG. 1 is a longitudinal sectional view of a continuous washing apparatus according to one embodiment of the present invention.

Referring to FIG. 1, a continuous washing apparatus embodying the present invention is shown. The washing apparatus includes a long generally cylindrical washing tab 1. the washing tab 1 has an inlet 2 and an outlet 3 of washing objects W. The washing tub 1 is inclined so that the inlet 2 is lower and the outlet 3 is upper position.

Transfer means is provided in the washing tub 1 to transfer the washing objects from the inlet region to the outlet region. The transfer means is formed by a screw assembly 4 which is rotatably mounted in the washing tub 1 and a drive means, not shown, to drive the screw assembly 4. The screw assembly 4 includes a band like fin 5 which is helically wound and extends longitudinally in the tub to form a central large opening 6.

The screw assembly 4 includes shafts 7 and 8 which are secured with the both ends of the fin 5. The sahft 7 is rotatably supported by a bearing 9 which is mounted on a support frame 10 which forms upper end wall of the tub 1. The shaft 8 is connected with a drive shaft 11 which passes through and is rotatably supported by a lower end wall of the tab 1. The drive shaft 11 is connected with the drive means e.g. an electric motor through suitable transmission.

Connection between the shaft 7 and the bearing 9 and between the shaft 8 and the drive shaft 11 are taper connections. Such a taper connection allows easy assembly and disassembly without needing accurate realignment. By removing the support frame 10, the screw assembly 4 can be inserted and removed in and from the washing tub 1.

The washing tub provides the washing means which includes, in the illustrated embodiment, cleaning liquid 12 stored in lower portion of the tub and air nozzles 13 to feed air in the cleaning liquid 12. Additional cleaning liquid nozzles 14 may be added. The additional nozzles 14 spray hot or cold water through a pipe which passes through central openings of the bearing 9 and the shaft 7 from outside.

Figure 2:
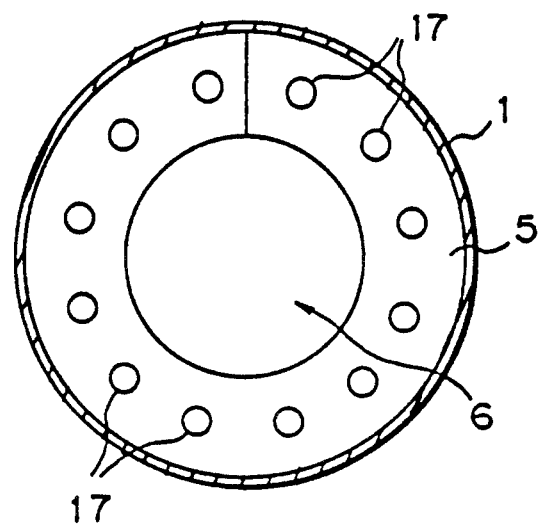
FIG. 2 is a sectional view along line 2—2 of FIG. 1.
Figure 3:
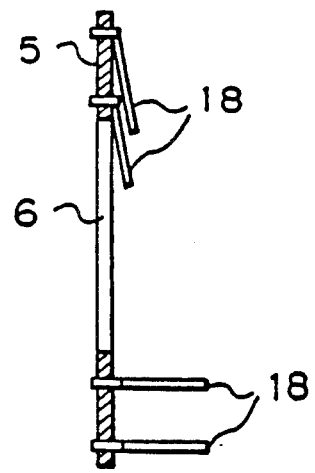
FIG. 3 is a sectional view of a fin in FIG. 1.

By the fin 5, as shown in FIG. 2, large central opening 6 is formed to convey the washing objects of the height only corresponding to the width of the fin 5 and excessive objects pass rearward from the central opening 6 so that overloading of the fin is effectively prevented. The fin 5 itself has many small openings 17 to allow to pass cleaning liquid and debris from the openings 17 when the fin moves upward along the inclination of the tab 1. Also, as shown in FIG. 3, many small rods 18 pivotably mounted on the surface of the fin 5 to agitate or tumble the washing objects while conveying the objects.

The bottom portion of the tab 1 has a reservoir 15 to store debris after washing. The reservoir 15 has a discharge pipe 16.

In operation, washing objects W are fed from the inlet 2, and the objects are conveyed by the screw assembly 4 upwards from the inlet region to the outlet region. The washing objects are washed by the cleaning liquid and the washed objects are discharged from the outlet 3.

Figure 4:
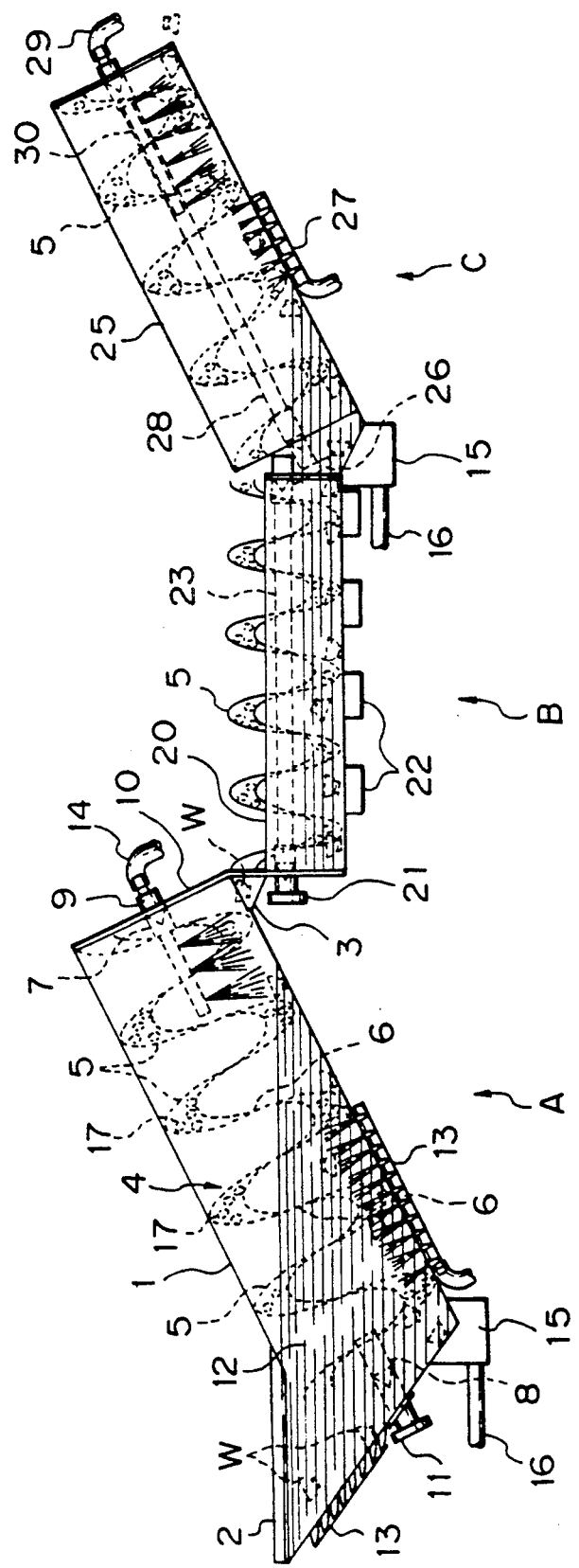
FIG. 4 is a longitudinal sectional view of a continuous washing apparatus according to second embodiment of the present invention.

FIG. 4 shows second embodiment of the present invention. As shown, the continuous washing apparatus includes a first washing apparatus A, a second washing apparatus B and a rinse and drying apparatus C. The first washing apparatus A is similar to that shown in FIG. 1.

The second washing apparatus B is arranged adjacent to the first washing apparatus A and includes a generally semi-circular sectioned washing tub 20 in which a fin 5 similar with that shown in FIG. 1 is arranged. A drive shaft 21 of the fin 5 is driven by a suitable motor, not shown. Washing water is sprayed from opening of the stationary pipe shaft 23. One or more supersonic wave generators 22 are mounted at bottom plate of the washing tub 20.

The rinse and drying apparatus C is arranged adjacent to the second washing apparatus B and includes a cylindrical drying tub 25 in which a fin 5, a reservoir 15 and a discharge pipe 16 which are similar with those shown in the first washing apparatus A are arranged and a drive shaft 26 of the fin 5 is driven by a motor, not shown. At the bottom of the drying tub 25 hot water nozzles 27 are arranged to assist the drying of the washing objects. Inside the drying tub 25, a stationary pipe 28 is mounted and through which hot air supplied from a hot air pipe 29 is injected.

In operation, at first washing objects W are fed from the inlet 1 of the first washing apparatus A and the fin 5 is rotated. The washing objects are washed by cleaning liquid which is agitated by the air supplied from the air nozzles 13 and are conveyed by the fin 5 generally for the height corresponding to the width of the fin 5 and excess objects over the height pass through the large opening 6 formed by the fin 5 and remain on the downstream side of the fin 5 so that the conveyed washing objects are limited to generally constant flow by the width of the fin 5. The washing objects are floated or tumbled by a liquid flow induced by air stream from the air nozzles 13. Washing objects change the attitude by rotation of the fin 5 to improve washing effect, and also, by many pivotably mounted rods 18 on the fin 5, washing objects reverse the attitude to further improve the washing effect. This feature is effective to wash planar objects such as dishes. Debris separate from the washing objects returns downwards through the many small openings 17 and clearance between the fin and the inner wall of the washing tub 1 to the reservoir 15 and is discharged through the discharge pipe 16. Washed objects are conveyed upwards by the fin 5 sequentially and are rinsed by hot or cold water from the nozzles 14 and are conveyed to the second washing apparatus B from the outlet 3.

In the second washing apparatus B, washing objects W are washed by the supersonic wave generator 22 and are conveyed to the rinse and drying apparatus C in which hot water from the hot water nozzles 27 at the bottom of the tub 25 assists drying of the objects, and then hot air from hot air nozzles 30 drys the washing objects.

It will be appreciated that the washing apparatus, according to the present invention, includes the inclined cylindrical washing tub having the inlet for washing objects, the rotatable helical fin supported in the tub at both ends and the large central opening formed by the fin so that the advantages described below are attained.

(a) As the helical fin is supported only at both ends in the tab so that longitudinal elasticity of the fin prevent the washing objects from being destroyed and also prevent the apparatus from overloading to improve the service life of the apparatus.

(b) As the helical fin forms large central opening so that the quantity of objects conveyed is constant. Thus, when a large quantity of washing objects is fed into the inlet, a constant quantity of object is sequentially conveyed.

(c) As the washing objects sequentially change position by the fin to improve the washing effect, and also many pivotable rods on the fin tumble the objects to improve the washing effect.

(d) As the fin has many small openings to allow a downward stream of cleaning liquid at low resistance; also debris separated from the objects flows back through the small openings with the cleaning liquid.

Many changes and modifications can be performed by those skilled in the art without departing from the spirit of the present invention. For example, the illustrated second embodiment includes the first washing apparatus A, the second washing apparatus B and the rinse and drying apparatus C, whereas, the washing tub of the first washing apparatus A may be long enough to involve functions of the second washing apparatus B and/or the rinse and drying apparatus C so that one long apparatus can perform washing to drying processes.

What is claimed is:

1. A continuous washing apparatus comprising a first elongated cylindrical washing tub inclined at an angle to a horizontal plane for holding a first body of cleaning liquid, said first washing tub having an inlet region for washing objects at a lower end portion of said first washing tub and an outlet region for washing objects at an upper end portion of said first washing tub with an upper side surface of the first body of cleaning liquid being disposed at a lower level than the outlet region for the washing objects, first transfer means in said first washing tub for moving the washing objects from the inlet region and through the upper side surface of the first body of cleaning liquid to the outlet region, said first transfer means including a first screw assembly rotatably mounted in said first washing tub for rotation about a first axis which is inclined at an angle to a horizontal plane, said first screw assembly including a first band-like helical fin extending from the inlet region to the outlet region and first drive means for rotating said first helical fin relative to said first washing tub to move washing the objects upwardly from the inlet region to the outlet region, said first helical fin having a large central opening which extends from the inlet region to the outlet region and through which washing objects can move downwardly toward the inlet region to prevent overloading of said first helical fin with the washing objects, a second elongated washing tub for at lest partially holding a second body of cleaning liquid, said second washing tub being generally horizontal and having an inlet region disposed adjacent to the outlet region of said first washing tub, said first screw assembly being operable to effect movement of the washing objects from the outlet region of said first washing tub to the inlet region of said second washing tub, said second washing tub having an outlet region at a end of said second washing tub opposite from the inlet region of said second washing tub, second transfer means in said second washing tub for moving washing objects from the inlet region of said second washing tub to the outlet region of said second washing tub, said second transfer means including a second screw assembly rotatably mounted in said second washing tub for rotation about a second axis which is generally horizontal, said second screw assembly including a second band-like helical fin extending from the inlet region to the outlet region of said second washing tub and second drive means for rotating said second helical fin relative to said second washing tub to move the washing objects along a generally horizontal path from the inlet region to the outlet region of said second washing tub, said second helical fin having a large central opening which extends from the inlet region of said second washing tub to the outlet region of said second washing tub and through which washing objects can move to prevent overloading of said second helical fin with washing objects, a third elongated cylindrical tub inclined at an angle to a horizontal plane, said third tub having an inlet region disposed adjacent to the outlet region of said second washing tub, said second screw assembly being operable to effect movement of the washing objects from the outlet region of said second washing tub to the inlet region of said third tub, said second body of cleaning liquid extending from the inlet region of said second washing tub and through the outlet region of said second washing tub into the inlet region of said third tub, said third tub having an outlet region for the washing objects at an upper end portion of said third washing tub with an upper side surface of the second body of cleaning liquid being disposed at a lower level than the outlet region of said third tub, third transfer means in said third tub for moving the washing objects from the inlet region of said third tub and through the upper side surface of the second body of cleaning liquid to the outlet region of said third tub, said third transfer means including a third screw assembly rotatably mounted in said third tub for rotation about a third axis which is inclined at an angle to a horizontal plane, said third screw assembly including a third band-like helical fin extending from the inlet region of said third tub to the outlet region of said third tub and third drive means for rotating said third helical fin relative to said third tub to move the washing objects upwardly from the inlet region of said third tub to the outlet region of said third tub, said third helical fin having a large central opening which extends from the inlet region of said third tub to the outlet region of said third tub and through which washing objects can move downwardly toward the inlet region of said third tub to prevent overloading of said third helical fin with washing objects.

2. An apparatus as set forth in claim 1 further including a first array of nozzles disposed in said third tub at a level above the upper surface of the second body of washing liquid for directing streams of liquid against the washing objects after the washing objects have been moved out of the second body of cleaning liquid by said third helical fin.

3. An apparatus according to claim 2 further including a second array of nozzles disposed in the large central opening in said third helical fin adjacent to the outlet region of said third tub for directing streams of fluid downwardly onto the washing objects after the washing objects have been sprayed by streams of liquid from said first array of nozzles.

4. An apparatus according to claim 1 further including supersonic wave generator means connected with said second washing tub for generating supersonic waves to wash the washing objects in said second washing tub.

* * * * *